(12) United States Patent
Bowen, III et al.

(10) Patent No.: US 6,809,135 B2
(45) Date of Patent: Oct. 26, 2004

(54) SILICA REINFORCED RUBBER COMPOSITION AND ARTICLE WITH COMPONENT THEREOF, INCLUDING TIRES

(75) Inventors: Daniel Edward Bowen, III, Munroe Falls, OH (US); Eric Sean Castner, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 448 days.

(21) Appl. No.: 09/838,487

(22) Filed: Apr. 19, 2001

(65) Prior Publication Data

US 2002/0010258 A1 Jan. 24, 2002

Related U.S. Application Data

(60) Provisional application No. 60/198,560, filed on Apr. 20, 2000.

(51) Int. Cl.$^7$ ................................................ C08K 5/57
(52) U.S. Cl. ........................................................ 524/178
(58) Field of Search ......................................... 524/178

(56) References Cited

U.S. PATENT DOCUMENTS

| | | | |
|---|---|---|---|
| 3,897,386 A | * 7/1975 | Sanda, Jr. .................... | 525/131 |
| 4,429,085 A | 1/1984 | Henderson et al. ............ | 526/92 |
| 4,742,137 A | 5/1988 | Ono et al. ...................... | 526/92 |
| 5,021,381 A | 6/1991 | Burroway et al. ........... | 502/117 |
| 5,087,668 A | 2/1992 | Sandstrom et al. .......... | 525/237 |

\* cited by examiner

*Primary Examiner*—Peter D. Mulcahy
(74) *Attorney, Agent, or Firm*—Henry C. Young, Jr.

(57) ABSTRACT

The present invention relates to the preparation of silica reinforced rubber compositions and to articles of manufacture which contain at least one component comprised thereof. Such article of manufacture may be a tire. The silica reinforced rubber composition comprises at least one elastomer, silica, and an organo-metal additive of least one of organo-tin, organo-titanium, and/or organo-zirconium compound, preferably to an exclusion of additional additives to the rubber composition which will readily react with hydroxyl groups (e.g. silanol groups) on the surface of the silica to create an alcohol such as, for example, alkylsilane, alkoxysilane, and bis-(3-alkoxysilylalkyl) polysulfide compounds. Such organo-metal compound may have a valance of four and in the case of the organo-tin compound may have a valance of four or two, preferably four. Such organo-metal compound may be selected from, for example, dibutyltin dilaurate, tin(II) 2-ethylhexanoate, dibutoxytitanium bis-2,4-pentanedionate, and dibutoxyzirconium bis-2,4-pentanedionate.

16 Claims, No Drawings

US 6,809,135 B2

SILICA REINFORCED RUBBER COMPOSITION AND ARTICLE WITH COMPONENT THEREOF, INCLUDING TIRES

This application claims the benefit of U.S. Provisional Application Ser. No. 60/198,560, filed on Apr. 20, 2000.

FIELD OF THE INVENTION

The present invention relates to the preparation of silica reinforced rubber compositions and to articles of manufacture which contain at least one component comprised thereof. Such article of manufacture may be a tire. The silica reinforced rubber composition comprises at least one elastomer, silica, and an organo-metal additive of least one of organo-tin, organo-titanium, and/or organo-zirconium compound, preferably to an exclusion of additional additives to the rubber composition which will readily react with hydroxyl groups (e.g. silanol groups) on the surface of the silica to create an alcohol such as, for example, alkylsilane, alkoxysilane, and bis-(3-alkoxysilylalkyl) polysulfide compounds. Such organo-metal compound may have a valance of four and in the case of the organo-tin compound may have a valance of four or two, preferably four. Such organo-metal compound may be selected from, for example, dibutyltin dilaurate, tin(II) 2-ethylhexanoate, dibutoxytitanium bis-2,4-pentanedionate, and dibutoxyzirconium bis-2,4-pentanedionate.

BACKGROUND OF THE INVENTION

For various applications utilizing rubber which require high strength and abrasion resistance, particularly applications such as tires and various industrial products, sulfur cured rubber is utilized which contains substantial amounts of reinforcing fillers.

Synthetic amorphous silica, such as for example, precipitated silica, and carbon black are commonly used reinforcing fillers for such purpose as is well known to those having skill in such art.

Such silica is often used in conjunction with a coupling agent in order to aid in coupling the silica to one or more elastomers, particularly conjugated diene-based elastomers. Such coupling agent conventionally has a moiety which is reactive with hydroxyl groups on the surface of the silica (e.g. silanol groups) and another moiety interactive with at least one of said diene-based elastomers in the rubber composition to be reinforced.

Conventionally, the moiety of the coupling agent intended to react with the hydroxyl groups on the surface of the silica is a silane-based moiety such as, for example, an alkoxysilane moiety which might be contained, for example in a coupling agent such as a bis (3-ethoxysilylpropyl) polysulfide which contains from 2 to about 6, with an average of about 2 to 2.6 or from 3.5 to 4 connecting sulfur atoms in its polysulfidic bridge.

Inherently, byproducts of an interaction of such coupling agent with hydroxyl groups on the surface of the silica is alcohol (e.g. ethanol) and water.

In the surprising discovery of this invention, a compound has been found which apparently acts to assist the silica in the reinforcement of a diene-based elastomer without having to use a conventional coupling agent for which alcohol is a byproduct.

In the description of this invention, the term "phr" where used herein, and according to conventional practice, refers to "parts of a respective material per 100 parts by weight of rubber, or elastomer".

In the description of this invention, the terms "rubber" and "elastomer" where used herein, may be used interchangeably, unless otherwise prescribed. The terms "rubber composition", "compounded rubber", and "rubber compound", if used herein, are used interchangeably to refer to rubber which has been blended or mixed with various ingredients and materials and such terms are well known to those having skill in the rubber mixing or rubber compounding art.

SUMMARY AND PRACTICE OF THE INVENTION

In accordance with this invention, a rubber composition is provided which comprises (A) 100 parts by weight of at least one diene-based elastomer, (B) about 10 to about 150, alternately about 10 to about 100, phr of at least one particulate reinforcing filler comprised of about 10 to about 100, alternately about 10 to about 80 of at least one particulate synthetic silica-based material which contains hydroxyl groups (e.g. silanol groups) on the surface thereof and correspondingly, about 0 to about 80, alternately about 5 to about 40 phr of rubber reinforcing carbon black, and (C) at least one organo-metal additive of at least one of organo-tin, organo-titanium and/or organo-zirconium compound, such organo-metal compound may have a valance of four and in the case of the organo-tin compound may have a valance of four or two, preferably four. Such organo-metal compound may be selected from, for example, dibutyltin dilaurate, tin(II) 2-ethylhexanoate, dibutoxytitanium bis-2,4-pentanedionate, and dibutoxyzirconium bis-2,4-pentanedionate.

In one aspect of this invention the said organo-tin compound having a valence of four may be, for example, dibutyltin dilaurate.

In particular, while dibutyltin dilaurate is the preferred organo-tin compound having a valence of four it is contemplated herein that said organo-tin compounds having a valence of four may be of the following general Formula (I), with corresponding specifications (I-a), (I-b), (I-c), and (I-d):

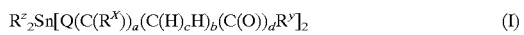

$$R^z{}_2Sn[Q(C(R^x))_a(C(H)_cH)_b(C(O))_dR^y]_2 \quad (I)$$

wherein:

(I-a) where Q is oxygen, a and b are zero, d is equal to one, and $R^y$ is an alkyl radical containing from one to 25, alternatively from 1 to 18, carbon atoms, where $R^z$ is an alkyl radical containing from one to 25, alternatively from 1 to 10, carbon atoms, or (I-b) where Q is oxygen, a, b, and d are equal to one, c is zero, $R^x$ and $R^y$ are the same or different radicals selected from hydrogen, methyl, $CF_3$, propyl, butyl and/or phenyl radicals, preferably from hydrogen and methyl radicals, where $R^z$ is an alkyl radical containing from one to 25, alternatively from 1 to 10, carbon atoms, or (I-c) where Q is sulfur, a is zero, b, c, and d are one, and $R^y$ is an alkyl radical containing from one to 25, alternatively from 1 to 18, carbon atoms, where $R^z$ is an alkyl radical containing from one to 25, alternatively from 1 to 10, carbon atoms, or (I-d) where Q is oxygen or sulfur, a, b, and d are zero and $R^y$ is an alkyl radical containing from one to 25, alternatively from 1 to 18, carbon atoms, where $R^z$ is an alkyl radical containing from one to 25, alternatively from 1 to 10, carbon atoms;

wherein, optionally, one or more of $R^x$, $R^y$, and $R^z$ are alkyl radicals containing heteroatoms, such as, for example Silicon, Nitrogen, Phosphorus, Oxygen, and Sulfur.

Representative examples of alkyl radicals for radicals $R^x$ and $R^y$ are, for example, methyl, ethyl, propyl, butyl, pentyl, hexyl, septyl, octyl, nonyl, decyl, undecyl, dodecyl, tridecyl, tetradecyl, pentadecyl, hexadecyl, heptadecyl, and octadecyl which, were possible, may be saturated or unsaturated, cyclic, or aromatic.

Representative examples of alkyl radicals for radicals $R^z$ are, for example, methyl, ethyl, propyl, butyl, pentyl, hexyl, septyl, octyl, nonyl, decyl which, were possible, may be saturated or unsaturated, cyclic, or aromatic.

Representative examples of heteroatom containing alky radicals for $R^x$, $R^y$, and $R^z$ are, for example, bis(trimethylsilyl)phosphate, methylpropanoate, 2-ethylhexylmaleate, 1-thioglycerol, and 1-ethoxyvinyl.

Representative examples of materials of Formula I are of the general Formulas (I-A), (I-B), (I-C), and (I-D):

$$R_2Sn(OC(O)R)_2 \quad (I\text{-}A)$$

$$RO_2Sn(OC(R)CHC(O)R)_2 \quad (I\text{-}B)$$

$$R_2Sn(SCH_2C(O)R)_2 \quad (I\text{-}C)$$

$$R_2Sn(OR)_2 \quad (I\text{-}D)$$

wherein R is an alkyl radical of which representative examples may include methyl, ethyl, propyl, butyl, pentyl, hexyl, septyl, octyl, nonyl, decyl, undecyl, dodecyl, tridecyl, tetradecyl, pentadecyl, hexadecyl, heptadecyl, aoctadecyl, bis(trimethylsilyl)phosphate, methylpropanoate, 2-ethylhexylmaleate, 1-thioglycerol, and 1-ethoxyvinyl.

Representative examples of organo-metal compounds, namely organotin compounds, of Formula I are, for example, dibutyltin dilaurate, di-n-butylbis(2-ethylhexanoate)tin, di-n-butylbis(2,4-pentanedionate)tin, di-n-butyldiacetoxytin, di-n-butyldiacrylatetin, di-n-butyldimethacrylatetin, dimethyldineodecanoatetin, dioctyldilauryltin, dioctyldineodecanoatetin.

In one aspect of this invention the aforesaid tin compound having a valence of two may be, for example, tin(II) 2-ethylhexanoate.

In particular, while tin(II) 2-ethylhexanoate is the preferred tin compound having a valance of two, it is contemplated herein that, tin compounds having a valence off two may be of the following general Formula (II), with corresponding specifications (II-a), (II-b), (II-c), and (II-d):

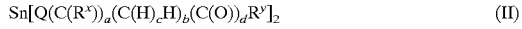

$$Sn[Q(C(R^x))_a(C(H)_cH)_b(C(O))_dR^y]_2 \quad (II)$$

wherein:

(II-a) where Q is oxygen, a and b are zero, d is equal to one, and $R^y$ is an alkyl radical containing from one to 25, alternatively from 1 to 18, carbon atoms, or (II-b) where Q is oxygen, a, b, and d are equal to one, c is zero, $R^x$ and $R^y$ are the same or different radicals selected from hydrogen, methyl, $CF_3$, propyl, butyl and/or phenyl radicals, preferably from hydrogen and methyl radicals, or (II-c) where Q is sulfur, a is zero, b, c, and d are one, and $R^y$ is an alkyl radical containing from one to 25, alternatively from 1 to 18, carbon atoms, or (II-d) where Q is oxygen or sulfur, a, b, and d are zero and $R^y$ is an alkyl radical containing from one to 25, alternatively from 1 to 18, carbon atoms;

wherein, optionally, one or more of $R^x$ and $R^y$ are alkyl radicals containing heteroatoms, such as, for example Silicon, Nitrogen, Phosphorus, Oxygen, and Sulfur.

Representative examples of alkyl radicals for radicals $R^x$ and $R^y$ are, for example, methyl, ethyl, propyl, butyl, pentyl, hexyl, septyl, octyl, nonyl, decyl, undecyl, dodecyl, tridecyl, tetradecyl, pentadecyl, hexadecyl, heptadecyl, and octadecyl which, where possible, may be saturated or unsaturated, cyclic, or aromatic.

Representative examples of heteroatom containing alky radicals for $R^x$ and $R^y$ are, for example, bis(trimethylsilyl)phosphate, methylpropanoate, 2-ethylhexylmaleate, 1-thioglycerol, and 1-ethoxyvinyl.

Representative examples of materials of Formula II are of the general Formulas (II-A), (II-B), (II-C), and (II-D):

$$Sn(OC(O)R)_2 \quad (II\text{-}A)$$

$$Sn(OC(R)CHC(O)R)_2 \quad (II\text{-}B)$$

$$Sn(SCH_2C(O)R)_2 \quad (II\text{-}C)$$

$$Sn(OR)_2 \quad (II\text{-}D)$$

wherein R is an alkyl radical of which representative examples are methyl, ethyl, propyl, butyl, pentyl, hexyl, septyl, octyl, nonyl, decyl, undecyl, dodecyl, tridecyl, tetradecyl, pentadecyl, hexadecyl, heptadecyl, aoctadecyl, bis(trimethylsilyl)phosphate, methylpropanoate, 2-ethylhexylmaleate, 1-thioglycerol, and 1-ethoxyvinyl.

Representative examples of materials of Formula II are, for example: tin(II) 2-ethylhexanoate, bis(neodecanoate)tin, diacetoxytin, stannous acetate, tin(II) hexafluoropentanedionate, and tin(II) 2,4-pentanedionate.

In one aspect of this invention additional organo-metal compounds (in addition to the aforesaid organotin compounds) are contemplated for use in this invention, particularly organo-titanium or organo-zirconium compounds having a valence of four.

In particular, while such additional organo-metal compounds are preferably organo-titanium or organo-zirconium compounds having a valence of four, it is contemplated herein that organo-metal compounds containing other metals (other than the aforesaid organotin compounds) in their highest valence state may be, for example, of the following general Formula (III), with corresponding specifications (III-a), (III-b), (III-c), and (III-d):

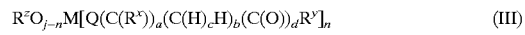

$$R^zO_{j-n}M[Q(C(R^x))_a(C(H)_cH)_b(C(O))_dR^y]_n \quad (III)$$

wherein:

(III-a) where M is a metal taken from Group III, IV, or V of the Periodic Table of the Elements as described in Chemical and Engineering News, Volume 63(5), Page 27 (1985), including Scandium, Yttrium, Titanium, Zirconium, and Vanadium, preferably Titanium and Zirconium, where j is the highest valence state of M which is intended to be a value of four for said preferred Titanium and Zirconium, where Q is oxygen, a and b are zero, d is equal to one, n is from 1 to j, $R^y$ is an alkyl radical containing from one to 25, alternatively from 1 to 18, carbon atoms, where $R^z$ is an alkyl radical containing from one to 25, alternatively from 1 to 18, carbon atoms, or (III-b) where M is a metal taken from Group III, IV, or V of the Periodic Table of the Elements as described in Chemical and Engineering News, Volume 63(5), Page 27 (1985), including Scandium, Yttrium, Titanium, Zirconium, and Vanadium, preferably Titanium and Zirconium, where j is the highest valence state of M which is intended to be a value of four for said preferred Titanium and Zirconium, where Q is oxygen, a, b, and d are equal to one, c is zero, n is from 1 to j, $R^x$ and $R^y$ are the same or different radicals selected from hydrogen, methyl, $CF_3$, propyl, butyl and/or phenyl radicals, preferably from hydrogen and methyl radicals, where $R^z$ is an alkyl radical containing from one to 25, alternatively from 1 to 18, carbon atoms, or (III-c) where M is a metal taken from Group III, IV, or V of the Periodic Table of the Elements as described in Chemical and Engineering News, Volume 63(5), Page 27 (1985), including Scandium, Yttrium, Titanium, Zirconium, and Vanadium, preferably Titanium and Zirconium, where j is the highest valence state of M which is intended to be a value of four for said preferred Titanium and Zirconium, where Q is sulfur, a is zero, b, c, and d are one, n is from 1 to j, $R^y$ is an alkyl radical containing from one to 25, alternatively from 1 to 18, carbon atoms, where $R^z$ is an alkyl radical containing from one to 25, alternatively from 1 to 18, carbon atoms, or (III-d) where M is a metal taken from Group III, IV, or V of the Periodic Table of the Elements as described in Chemical and Engineering News, Volume 63(5), Page 27 (1985), including Scandium, Yttrium, Titanium, Zirconium, and Vanadium, preferably Titanium and Zirconium, where j is the highest valence state of M which is intended to be a value of four for said preferred Titanium and Zirconium, where Q is oxygen, n is from 1 to j, a, b, and d are zero, $R^y$ and $R^z$ are the same or different alkyl radicals containing from one to 25, alternatively from 1 to 18, carbon atoms, where $R^z$ is an alkyl radical containing from one to 25, alternatively from 1 to 18, carbon atoms;

wherein, optionally, one or more of $R^x$, $R^y$, and $R^z$ are alkyl radicals containing heteroatoms, such as, for example Silicone, Nitrogen, Phosphorus, Oxygen, and Sulfur.

Representative examples of alkyl radicals for radicals $R^x$, $R^y$ and $R^z$ are, for example, methyl, ethyl, propyl, butyl, pentyl, hexyl, septyl, octyl, nonyl, decyl, undecyl, dodecyl, tridecyl, tetradecyl, pentadecyl, hexadecyl, heptadecyl, and octadecyl which, where possible, may be saturated or unsaturated, cyclic, or aromatic.

Representative examples of heteroatom containing alky radicals for $R^x$, $R^y$, and $R^z$ are, for example, bis(trimethylsilyl)phosphate, methylpropanoate, 2-ethylhexylmaleate, 1-thioglycerol, and 1-ethoxyvinyl.

Representative examples of materials of Formula III are of the general Formulas (III-A), (III-B), and (III-C):

$$RO_2M(OC(O)R)_2 \tag{III-A}$$

$$RO_2M(OC(R)CHC(O)R)_2 \tag{III-B}$$

$$M(OR)_4 \tag{III-C}$$

wherein R is an alkyl radical of which representative examples are methyl, ethyl, propyl, butyl, pentyl, hexyl, septyl, octyl, nonyl, decyl, undecyl, dodecyl, tridecyl, tetradecyl, pentadecyl, hexadecyl, heptadecyl, aoctadecyl, bis(trimethylsilyl)phosphate, methylpropanoate, 2-ethylhexylmaleate, 1-thioglycerol, and 1-ethoxyvinyl.

Representative examples of materials of Formula III are, for example: titanium n-butoxide, dibutoxytitanium bis-2,4-pentanedionate, titanium diisopropoxide (bis-2,4-pentanedionate), titanium diisopropoxide bis (tetramethylheptanedionate), titanium ethoxide, titanium 2-ethylhexoxide, titanium isobutoxide, titanium methoxide, titanium n-nonyloxide, titanium n-propoxide, titanium stearyloxide, titanium triisostearoylisopropoxide, neopentyl (diallyl)oxy, dibutoxyzirconium bis-2,4-pentanedionate, tri- neodecanoyl zirconate, neopenyl(dially)oxy tri(dodecyl) benzene-sulfonyl zirconate, neopentyl(diallyl)oxy tri (dioctyl)phosphato zirconate, neopentyl(dially)oxy trimethylacryl zirconate, neopentyl(dially)oxy triacryl zirconate, dineopenyl(dially)oxy diparamino benzoyl zirconate, dineopentyl(diallyl)oxy di(3-mercapto) propionic zirconate, yttrium acetate, vanadium(III) 2,4-pentanedionate, and tantalum(V) tetraethoxide pentainedionate.

In one aspect of this invention the said organo-tin compounds having a valence of four may be, for example, of the following general Formula (IV), with corresponding specifications (IV-a) and (IV-b):

$$R^xSnR^y_3 \tag{IV}$$

wherein:

(IV-a) where $R^x$ and $R^y$ are the same or different alkyl radical containing from one to 25, alternatively from 1 to 18, carbon atoms.

(IV-b) where $R^x$ is a polymeric chain consisting of at least one conjugated diene monomer such as, for example butadiene or isoprene of which the weight average molecular weight (Mw) is from 1,000 to 300,000, preferably 1,000 to 150,000, and $R^y$ is an alkyl radical containing from one to 25, alternatively from 1 to 18, carbon atoms;

wherein, optionally, one or more of $R^x$ and $R^y$ are alkyl radical containing heteroatoms, such as, for example Silicone, Nitrogen, Phosphorus, Oxygen, and Sulfur.

Representative examples of alkyl radicals for radicals $R^x$ and $R^y$ are, for example, methyl, ethyl, propyl, butyl, pentyl, hexyl, septyl, octyl, nonyl, decyl, undecyl, dodecyl, tridecyl, tetradecyl, pentadecyl, hexadecyl, heptadecyl, and octadecyl which, where possible, may be saturated or unsaturated, cyclic, or aromatic.

Representative examples of heteroatom containing alkyl radicals for $R^x$ and $R^y$ are, for example, bis(trimethylsilyl) phosphate, methylpropanoate, 2-ethylhexylmaleate, 1-thioglycerol, and 1-ethoxyvinyl.

Representative examples of polymeric chains for $R^x$ are, for example, polybutadiene, polyisoprene, poly-stryene-butadiene, poly-stryene-isoprene, poly-styrene-butadiene-isoprene, etc.

Representative examples of materials of Formula IV are of the general Formulas (IV-A) and (IV-B):

$$SnR_4 \tag{IV-A}$$

$$R_1SnR_3 \tag{IV-B}$$

wherein R is an alkyl radical of which representative examples may include methyl, ethyl, propyl, butyl, pentyl, hexyl, septyl, octyl, nonyl, decyl, undecyl, dodecyl, tridecyl, tetradecyl, pentadecyl, hexadecyl, heptadecyl, and octadecyl which, were possible, may be saturated or unsaturated, cyclic, or aromatic, and bis(trimethylsilyl)phosphate, methylpropanoate, 2-ethylhexylmaleate, 1-thioglycerol, and 1-ethoxyvinyl.

Representative examples of materials of Formula IV are, for example: allyltri-n-butyltin, allyltrimethyltin, allytriphenyltin, divinyldi-n-butyltin, 1-ethoxyvinyltri-n-butyltin, ethynyltri-n-butyltin, phenylethynyltri-n-butyltin, phenyltri-n-butyltin, tetraallyltin, tetra-n-butyltin, tetraethyltin, tetra-n-octyltin, tetra-n-pentyltin, tetraphenyltin, tetra-p-tolyltin, and 2-thiophenyltri-n-butyltin.

In one aspect of the invention the amount of said organo-tin, organo-titanium, or organo-zirconium compound used may be in an amount of about 0.01 to about 30, alternately about 0.05 to about 20, and alternately about 0.08 to about 10, phr.

In one aspect of the invention it is contemplated that said organo-tin, organo-titanium, and organo-zirconium compounds may be used individually or in combination.

In practice, where evolution of alcohol(s) from a rubber composition during its processing and in the manufacture of various articles, including tires and industrial products is not desired, it is preferred that additional additives are not added to a rubber composition which is intended to be reinforced with a silica-based material such as for example aggregates of synthetic amorphous silica and silica modified carbon blacks, which contain hydroxyl groups (e.g. silanol groups) on their surfaces which will readily react with such hydroxyl groups to form alcohol(s). By the term "readily reacts" it is meant that alcohol is formed under high shear mixing conditions at a temperature lower than 200° C., within 20 minutes.

Accordingly, it is preferred that the rubber composition of this invention is exclusive of additional additives which will readily react with hydroxyl groups contained on the surface of synthetic silica-based materials, such as for example, aggregates of amorphous silicas, to create an alcohol. Such exclusivity is particularly preferred where said organo-metal compound used in this invention is a tin compound having a valence of two or four, such as for example dibutyltin dilaurate and tin(II) 2-ethylhexanoate.

In practice, various additives are often added to a rubber composition to which such silica-based material(s) have been or are intended to be added which are intended to readily react with hydroxyl groups on the surface of, and to therefore modify, such silica-based materials in situ within the rubber host as the rubber composition is mixed under high shear and high temperature conditions. Sometimes the additive is intended to be a coupling agent to aid in coupling the silica-based material to the rubber itself.

Representative of such additives are, for example, bis-(3-alkoxysilylalkyl) polysulfides having an average of at least 2 and generally from 2 to about 4 connecting sulfur atoms in its polysulfidic bridge, such as for example bis-(3-triethoxysilylpropyl) disulfide and tetrasulfide materials, as well as alkoxy silanes and alkyl silanes, where it is intended that the alkoxy and/or silane portion of such material readily reacts, or otherwise interacts, with the hydroxyl groups on the surface of the silica-based material.

Addition of such additives to various silica-containing rubber compositions is well known to those having skill in such art.

It is readily seen that various alcohols may be formed by such reaction, or interaction of such materials with hydroxyl groups (e.g. silanol groups) which may be contained on the surface of silica-based materials such as, for example, aggregates of synthetic amorphous precipitated silica, of fumed silica and of silica treated carbon black.

Accordingly, where is desired that such alcohols not be formed in situ within an elastomer host, it is preferred in the practice of this invention that the rubber composition of this invention is exclusive of additional additives which will readily react with hydroxyl groups (e.g. silanol groups) on the surface of such synthetic silica-based materials in situ within the elastomer host and particularly exclusive of bis-(3-trialkoxysilylakyl) polysulfides, alkoxysilane and alkyl silane additives.

In the practice of this invention, the particulate silica-based reinforcement may be used alone or in combination with carbon black.

Such silica-based filler may be selected from, for example, amorphous silica and silica treated carbon black.

Such amorphous silica may be, for example, in a form of aggregates of precipitated silica or of fumed silica, usually preferably precipitated silica aggregates.

Such precipitated silica is intended herein to include aggregates of precipitated silica, as well as aggregates of co-precipitated silica and a minor amount of aluminum, such as, for example, by co-precipitating a sodium silicate and a minor amount of an alumuminate.

The term "aggregate" is used in a conventional sense, namely an aggregate of a multiplicity of elementary primary particles as would be understood by one having skill in such art.

The aforesaid silica treated, or modified, carbon black, while carbon black is considered to be a major portion thereof with the silica, or silicon based, portion being a minority, is nevertheless referred to herein as a silica-based material.

Such silica treated, or modified, carbon black may be accomplished, for example, by chemically treating carbon black with an alkoxysilane or by co-fuming silica and carbon black at a an elevated temperature.

In a further practice of the invention, the aforesaid organo-metal compound(s), particularly the tin compound having a valence of four, such as dibuytyltin dilaurate, organo-tin compound having a valence of two, such as tin(II) 2-ethylhexanoate, or organo-titanium or organo-zirconium compound having a valence of four, such as dibutoxytitanium bis-2,4-pentanedionate or dibutoxyzirconium bis-2,4-pentanedionate may be used as a composite of the said organo-metal compound and particulate carbon black or silica, preferably silica. In such practice, the carbon black or silica, as the case may be, acts as a carrier for the organo-metal compound. This may be advantageous in that it may allow two or more compounding ingredients (e.g. the organo-metal compound and a portion of a rubber reinforcing pigment such as the silica and/or carbon black) to be added to the rubber composition at the same time. It may also be beneficial where the organo-metal compound is either a liquid or viscous material, in that the organo-metal compound, combined with a particulate carrier, may be added in a free-flowing form such as, for example, as a powder, or other granular form or even as extruded pellets.

In practice, the weight ratio of said silica-based material, particularly aggregates of precipitated silica, to the said organo-metal compound, namely the organo-tin, organo-titanium, or organo-zirconium compound, may be in a range of about 1/1 to about 8/1, alternately about 1/1 to about 3/1.

Where the rubber composition contains both silica and carbon black reinforcing pigments the silica or the carbon black may be in the majority of the reinforcement pigments and, for some applications, it may be desired that the rubber composition be primarily reinforced with silica as the reinforcing pigment. In such case, it may be preferred that weight ratio of silica to carbon black is at least 0.5/1, alternately at least 3/1 and even at least 10/1 and therefore, for example, in a range of about 0.5/1 to about 30/1.

In an additional practice of the invention, it is contemplated herein that a synthetic amorphous silica, or silica modified carbon black, particularly synthetic silica aggregate, may be (1) pre-treated with said organo-metal compound, namely said organo-tin, organo-titanium, and/or organo-zirconium compound and (2) alternately also pre-treated with at least one of an alkylsilane, alkoxysilane, alkylalkoxysilane, and bis (3-trialkoxysilylalkyl) polysulfide, for example, bis-(3-triethoxysilylpropyl) polysulfice, having an average of from 2 to 2.6 or from 3.5 to 4 connecting sulfur atoms in its polysulfidic bridge.

It is to be appreciated that the rubber composition of this invention can be provided as being sulfur cured. The sulfur curing is accomplished in a conventional manner, namely by curing under conditions of elevated temperature and pressure for a suitable period of time.

Accordingly, an article of manufacture having at least one component comprised of the rubber composition of this invention is provided.

Such article of manufacture may be, for example, a tire or an industrial product having at least one component comprised of the rubber composition of this invention.

Such industrial product may be, for example, selected from hoses, such as for example fluid transmission hoses, as well as belts such as for example power transmission belts and conveyor belts.

A rubber tire may have various components comprised of the rubber composition of this invention. For example, such components may be, although not intended herein to be limited to, tread, tread cap of a tread cap/base construction, tread base of a tread cap/base construction, sidewall, sidewall stiffener insert such as, for example, an apex.

For the practice of this invention, the conjugated diene-based rubber for the rubber composition may be various elastomers. For example, such rubber may be selected from homopolymers and copolymers of at least one diene selected from isoprene and 1,3-butadiene and from copolymers of at least one conjugated diene such as isoprene and 1,3-butadiene with a vinyl aromatic compound selected from styrene and alphamethyl styrene, preferably styrene.

Representative of such elastomers are, for example, cis 1,4-polyisoprene rubber (natural and/or synthetic, and preferably natural rubber), 3,4-polyisoprene rubber, styrene/butadiene copolymer rubbers (including aqueous emulsion polymerization prepared rubber and organic solvent polymerization prepared rubber), isoprene/butadiene copolymer rubbers, styrene/isoprene copolymer rubbers, styrene/isoprene/butadiene terpolymer rubbers, cis 1,4-polybutadiene rubber, high vinyl polybutadiene rubber having about a 12 to about 90, alternatively about 30 to about 90, percent vinyl 1,2-content, and syndiotactic polybutadiene.

In practice, said diene-based rubber composition may contain a tin coupled elastomer prepared by organic solvent solution polymerization of monomers selected from at least one of 1,3-butadiene and isoprene diene monomers or from at least one of 1,3-butadiene and isoprene diene monomers together with styrene monomer. Said tin coupled elastomers may be, for example, tin coupled elastomers selected from at least one of styrene/butadiene copolymers, isoprene/butadiene copolymers, styrene/isoprene copolymers and styrene/isoprene/butadiene terpolymers The preparation of tin coupled elastomers via organic solvent solution polymerization is well known to those having skill in such art.

In one aspect of the invention, the diene-based rubber composition may preferably contain at least two diene-based rubbers. For example, a combination of two or more rubbers is preferred such as cis 1,4-polyisoprene rubber (natural or synthetic, although natural is preferred), styrene/isoprene/butadiene rubber, emulsion and solution polymerization derived styrene/butadiene rubbers, cis 1,4-polybutadiene rubbers.

The rubber composition may also contain a minor amount of trans 1,4-polybutadiene rubber (70–95 percent trans) and/or 3,4-polyisoprene rubber.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely a bound styrene content of about 30 to about 45 percent.

The relatively high styrene content of about 30 to about 45 for the E-SBR might be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to 50%. In one aspect, the E-SBR may also contain acrylonitrile to form a terpolymer rubber, as E-SBR, in amounts, for example, of about 2 to about 30 weight percent bound acrylonitrile in the terpolymer.

Emulsion polymerization prepared styrene/butadiene/acrylonitrile terpolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR might be used in a tire tread for promoting a reduction tire rolling resistance as a result of lower hysteresis of the rubber composition itself.

The 3,4-polyisoprene rubber (3,4-PI), if used, may be beneficial for a purpose of enhancing the tire's traction when it is used in a tire tread composition.

The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered may be beneficial for a purpose of enhancing the reduction in a tire tread's wear, or treadwear.

Such BR can be prepared, for example, by organic solution polymerization of 1,3-butadiene.

The BR may be conveniently characterized, for example, by having at least a 90% cis 1,4-content.

The cis 1,4-polyisoprene natural and synthetic rubber are well known to those having skill in the rubber art.

The syndiotactic 1,2-polybutadiene containing polymer may be prepared, for example, by physical blending of the syndiotactic 1,2-polybutadiene resin in another polymer(s) or by polymerization in an existing polymer(s) serving as a host. The syndiotactic 1,2-polybutadiene itself may be prepared, for example, by emulsion, solution, or suspension polymerization processes as would be well known those having skill in such art. For example, see U.S. Pat. Nos. 4,742,137, 4,429,085 and 5,021,381.

The vulcanized rubber composition for a tire tread should normally contain a sufficient amount of silica, and carbon black if used, reinforcing filler(s) to contribute a reasonably high modulus and high resistance to tear. The combined weight of the silica and carbon black, as hereinbefore referenced, may be as low as about 30 parts per 100 parts rubber, but is preferably from about 45 to about 90 parts by weight.

The commonly employed siliceous pigments used in rubber compounding applications can be used as the silica in this invention, including the aforesaid fumed and precipitated silicas, although precipitated silicas are preferred.

The siliceous pigments preferably employed in this invention are precipitated silicas such as, for example, those obtained by the acidification of a soluble silicate, e.g., sodium silicate, including a co-precipitation of the silicate and a minor amount of an aluminate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the Journal of the American Chemical Society, Volume 60, Page 304 (1930).

The silica may also be typically characterized by having a dibutylphthalate (DBP) value in a range of about 100 to about 400, and more usually about 150 to about 300.

Various commercially available silicas may be considered for use in this invention such as, only for example herein, and without limitation, silicas commercially available from PPG Industries under the Hi-Sil trademark with designations 210, 243, etc; silicas available from Rhodia Inc., with, for example, designations of Zeosil 1165MP and Zeosil 165GR, silicas available from Degussa AG with, for example, designations VN2, VN3, BV330GR, etc and silicas available from Huber with a designation of Huber Sil 8745.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents, and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of reinforcing type carbon blacks(s), for this invention, if used, are hereinbefore set forth. It is to be appreciated that the silica coupler may be used in conjunction with a carbon black, namely, pre-mixed with a carbon black prior to addition to the rubber composition, and such carbon black is to be included in the aforesaid amount of carbon black for the rubber composition formulation. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in the Vanderbilt Rubber Handbook (1978), Pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from 2 to 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of silica as a reinforcing filler in combination with dithiodicaprolactam as a coupling agent.

The presence and relative amounts of the above additives are not considered to be an aspect of the present invention, unless otherwise specified herein, which is more primarily directed to the utilization of specified blends of rubbers in rubber compositions, in combination with silica and organo-metal compounds such as, for example, organo-tin, organo-titanium, or organo-zirconium compounds, such as, for example, dibutyltin dilaurate or, for example, blends of such organo-metal compounds and silica as well as, optionally, carbon black, for the reinforcement of the rubber.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, silica and silica coupler, and carbon black if used, are mixed in one or more non-productive mix stages. The terms "non-productive" and "productive" mix stages are well known to those having skill in the rubber mixing art.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

In this example, dibutyltin dilaurate was evaluated as an alternative for a relatively commonly used silica coupling agent, bis-(3-triethoxysilylpropyl) disulfide, in a silica reinforced rubber composition.

Table 1 below shows the basic rubber compounds that were used in the seven samples in this example. Each of these samples was mixed using an internal, miniature Banbury type mixer (Haake Rheocord 9000) at a rotor speed of 55 rpm. The mixing experiments were conducted in such a way as to maintain an internal mix temperature in the range of 170° C. to 180° C.

The elastomer used in this example was a hexane organic solvent polymerization prepared styrene-butadiene rubber containing 25 percent styrene and 50 percent vinyl 1,2 groups. The silica used in this example was obtained as Zeosil 1165MP from Rhodia Inc. The coupling agent used in this example was bis-(3-triethoxysilylpropyl) disulfide obtained as Si266 from Degussa Ag. The dibutyltin dilaurate used in this example was obtained and used as a neat viscous liquid from Aldrich.

The same basic mixing procedure was used for all of the samples. The elastomer was added first to the internal mixer at time zero. Where used, silica was added to the internal mixer after about 3 minutes of mixing. Where used, a bis (3-triethoxysilylpropyl) disulfide material was added to the internal mixer after about 5 minutes of mixing time. Where used, dibutyltin dilaurate was added to the internal mixer after about 6 minutes of mixing time. The total mixing time in the internal mixer did not exceed 10 minutes. Upon reaching about 10 minutes of mixing time, the mixed ingredients where removed from the internal mixer, allowed to cool under atmospheric conditions to a temperature below 50° C., milled on an open roll mill, and sheeted out from the open roll mill at thickness of about 0.6 cm (0.25 inch).

The basic rubber compounds are shown in the Table 1 as the aforesaid Samples 1 through 7 in which Samples 1, 2, and 3 are intended to be Control Samples.

TABLE 1

| 1) Elastomer | 1 | Parts |
|---|---|---|
| Total wt elastomer (g) | 275 | 100 |
| Total weight (g) or total phr | 275.00 | 100.00 |
| 2) Elastomer and silica | 2 | Parts |
| Total wt elastomer (g) | 211 | 100 |
| Silica (g) | 63.3 | 30 |
| Total weight (g) or total phr | 274.3 | 130.00 |
| 3) Elastomer, silane coupling agent, and silica | 3 | Parts |
| Total wt elastomer (g) | 200 | 100 |
| Silane coupling agent (g) | 14.75 | 7.375 |
| Silica (g) | 60 | 30 |
| Total weight (g) or total phr | 274.750 | 137.375 |
| 4) Elastomer, silica, and ca. 0.08 phr dibutyltin dilaurate | 4 | Parts |
| Total wt elastomer (g) | 211 | 100 |
| Silica (g) | 63.3 | 30 |
| Dibutyltin dilaurate (g) | 0.168 | 0.080 |
| Dibutyltin dilaurate (mL) | 0.158 | |
| Total weight (g) or total phr | 274.5 | 130.08 |
| 5) Elastomer silica, and ca. 0.8 phr dibutyltin dilaurate | 5 | Parts |
| Total wt elastomer (g) | 210 | 100 |
| Silica (g) | 63 | 30 |
| Dibutyltin dilaurate (g) | 1.684 | 0.802 |
| Dibutyltin dilaurate (mL) | 1.580 | |
| Total weight (g) or total phr | 274.7 | 130.80 |
| 6) Elastomer and ca. 0.061 phr dibutyltin dilaurate | 6 | Parts |
| Total wt elastomer (g) | 274.8 | 100 |
| Dibutyltin dilaurate (g) | 0.168 | 0.061 |
| Dibutyltin dilaurate (mL) | 0.158 | |
| Total weight (g) or total phr | 275.0 | 100.06 |
| 7) Elastomer and ca. 0.62 phr dibutyltin dilaurate | 7 | Parts |
| Total wt elastomer (g) | 273 | 100 |
| Dibutyltin dilaurate (g) | 1.684 | 0.617 |
| Dibutyltin dilaurate (mL) | 1.580 | |
| Total weight (g) or total phr | 274.7 | 100.62 |

The milled samples from Table 1 were tested using a Rubber Process Analyzer (RPA). The samples were tested using a frequency sweep at 100° C. The strain degree for the frequency sweep was 0.5°. The set frequencies tested (in cycles per minute or "cpm") were 2.0, 5.0, 10.0, 20.0, 50.0, 100.0, 200.0, 500.0, 1000.0, 2000.0.

The results of testing, in terms of Frequency versus Tan Delta at 100° C., are shown in the following Table 2, as Samples 1 through 7.

TABLE 2

Frequency v. Tan Delta at 100° C.

| Frequency | 1 | 2 | 3 | 4 | 5 | 6 | 7 |
|---|---|---|---|---|---|---|---|
| 2 | 0.54 | 0.527 | 0.393 | 0.441 | 0.387 | 0.556 | 0.518 |
| 5 | 0.515 | 0.498 | 0.381 | 0.43 | 0.375 | 0.545 | 0.522 |
| 10 | 0.488 | 0.475 | 0.371 | 0.392 | 0.358 | 0.524 | 0.5 |
| 20 | 0.457 | 0.442 | 0.361 | 0.388 | 0.347 | 0.495 | 0.438 |
| 50 | 0.441 | 0.4 | 0.339 | 0.357 | 0.329 | 0.459 | 0.432 |
| 100 | 0.402 | 0.367 | 0.321 | 0.336 | 0.312 | 0.4 | 0.396 |
| 200 | 0.367 | 0.328 | 0.298 | 0.304 | 0.285 | 0.361 | 0.34 |
| 500 | 0.313 | 0.284 | 0.266 | 0.271 | 0.253 | 0.315 | 0.298 |
| 1000 | 0.276 | 0.251 | 0.251 | 0.239 | 0.236 | 0.274 | 0.268 |
| 2000 | 0.233 | 0.234 | 0.219 | 0.229 | 0.227 | 0.243 | 0.24 |

It can be readily seen from Table 2 by comparing control Sample 1, which only contains SBR, and control Sample 2, which contains SBR and 30 phr silica, that at low frequencies (frequencies below 100 cpm) the addition of silica provides a modest reduction in Tan Delta values. However, when Sample 4 and Sample 5, which contain SBR, silica, and either 0.08 phr or 0.8 phr dibutyltin dilaurate are compared with control Sample 2, which only contains SBR and silica, a significant, additional reduction in Tan Delta values is achieved. Furthermore, Sample 4 and Sample 5, which contain SBR, silica, and either 0.08 phr or 0.8 phr dibutyltin dilaurate, exhibit Tan Delta values that are similar to or lower than those of Sample 3, which contains SBR, silica, and 7.38 phr coupling agent. Additionally, when Samples 6 and Sample 7, which only contain SBR and either 0.062 phr or 0.62 phr dibutyltin dilaurate, are compared with Sample 4 and Sample 5, which contain SBR, silica, and either 0.08 phr or 0.8 phr dibutyltin dilaurate, it can be seen that at low frequencies (frequencies below 100 cpm) the combination of silica and dibutyltin dilaurate significantly reduces Tan Delta values.

These results are considered herein to be significant because they combine to demonstrate that the addition of both silica and dibutyltin dilaurate, at 0.08 phr and 0.8 phr, to SBR provides a reduction in Tan Delta values, such that they are nearly equal to or lower than those obtained using the coupling agent bis (3-triethoxysilylpropyl) disulfide.

The results of testing in terms of Frequency versus Storage Modulus (G') at 100° C. is shown in the following Table 3, as Samples 1 through 7.

TABLE 3

Frequency v. G' (Storage Modulus, MPa) at 100° C.

| Frequency | 1 | 2 | 3 | 4 | 5 | 6 | 7 |
|---|---|---|---|---|---|---|---|
| 2 | 38.253 | 142.3 | 171.37 | 169.84 | 203.5 | 34.427 | 42.843 |
| 5 | 52.024 | 190.5 | 212.68 | 211.92 | 250.94 | 50.493 | 51.259 |
| 10 | 64.264 | 233.34 | 249.41 | 255.53 | 293.02 | 62.734 | 65.795 |
| 20 | 80.331 | 283.83 | 289.95 | 301.43 | 339.68 | 78.8 | 80.331 |
| 50 | 104.05 | 361.87 | 349.63 | 371.05 | 409.3 | 101.75 | 106.34 |
| 100 | 125.7 | 427.66 | 404.71 | 429.96 | 468.98 | 126.23 | 129.29 |
| 200 | 149.95 | 497.28 | 462.09 | 493.46 | 534.77 | 148.42 | 155.31 |
| 500 | 183.61 | 595.21 | 543.95 | 582.2 | 622.75 | 184.38 | 192.79 |
| 1000 | 213.45 | 665.6 | 599.8 | 651.06 | 688.55 | 211.92 | 214.21 |
| 2000 | 236.4 | 725.27 | 669.42 | 703.08 | 746.69 | 236.4 | 239.46 |

It can be readily seen from Table 2 by comparing control Sample 1, which only contains SBR, and control Sample 2, which contains SBR and 30 phr silica, that at low frequencies (frequencies below 100 cpm) the addition of silica provides an increase in G'. However, when Sample 4 and Sample 5, which contain SBR, silica, and either 0.08 phr or 0.8 phr dibutyltin dilaurate are compared with control Sample 2, which only contains SBR and silica, a modest increase in G' is achieved. Furthermore, Sample 4 and Sample 5, which contain SBR, silica, and either 0.08 phr or 0.8 phr dibutyltin dilaurate, exhibit G' values that are higher than those of Sample 3, which contains SBR, silica, and 7.38 phr coupling agent. Additionally, when Samples 6 and Sample 7, which only contain SBR and either 0.062 phr or 0.62 phr dibutyltin dilaurate, are compared with Sample 4 and Sample 5, which contain SBR, silica, and either 0.08 phr or 0.8 phr dibutyltin dilaurate, it can be seen that at low frequencies (frequencies below 100 cpm) the combination of silica and dibutyltin dilaurate significantly increases G'.

These results are considered herein to be significant because they combine to demonstrate that the addition of both silica and dibutyltin dilaurate, at 0.08 phr and 0.8 phr, to SBR provides an increase in G', such that they are greater than those obtained using the coupling agent bis (3-triethoxysilylpropyl) disulfide.

The results of testing in terms of Set Strain versus Tan Delta at 100° C. is shown in the following Table 4, as Samples 1 through 7.

TABLE 4

Set Strain (deg.) v. Tan Delta at 100° C.

| Strain | 1 | 2 | 3 | 4 | 5 | 6 | 7 |
|---|---|---|---|---|---|---|---|
| 0.5 | 0.513 | 0.479 | 0.383 | 0.407 | 0.351 | 0.493 | 0.526 |
| 1 | 0.503 | 0.507 | 0.391 | 0.43 | 0.387 | 0.518 | 0.493 |
| 2 | 0.519 | 0.578 | 0.443 | 0.488 | 0.446 | 0.551 | 0.507 |
| 5 | 0.591 | 0.804 | 0.642 | 0.685 | 0.622 | 0.628 | 0.59 |
| 10 | 0.772 | 1.13 | 0.901 | 0.974 | 0.852 | 0.835 | 0.781 |
| 20 | 1.093 | 1.595 | 1.195 | 1.394 | 1.129 | 1.231 | 1.13 |
| 50 | 1.402 | 2.555 | 1.697 | 2.033 | 2.092 | 1.65 | 1.45 |
| 90 | 2.28 | 4.198 | 3.084 | 3.461 | 3.485 | 2.257 | 2.412 |

It can be readily seen from Table 4 by comparing control Sample 1, which only contains SBR, and control Sample 2, which contains SBR and 30 phr silica, that at low strain (set strain angles below 2 deg.) the addition of silica provides little or no reduction in Tan Delta values. However, when Sample 4 and Sample 5, which contain SBR, silica, and either 0.08 phr or 0.8 phr dibutyltin dilaurate are compared with control Sample 2, which only contains SBR and silica, a significant, additional reduction in Tan Delta values is achieved. Furthermore, Sample 4 and Sample 5, which contain SBR, silica, and either 0.08 phr or 0.8 phr dibutyltin dilaurate, exhibit Tan Delta values that are similar to or lower than those of Sample 3, which contains SBR, silica, and 7.38 phr coupling agent. Additionally, when Samples 6 and Sample 7, which only contain SBR and either 0.062 phr or 0.62 phr dibutyltin dilaurate, are compared with Sample 4 and Sample 5, which contain SBR, silica, and either 0.08 phr or 0.8 phr dibutyltin dilaurate, it can be seen that at low strain (set strain angles below 2 deg.) the combination of silica and dibutyltin dilaurate significantly reduces Tan Delta values.

These results are considered herein to be significant because they combine to demonstrate that the addition of both silica and dibutyltin dilaurate, at 0.08 phr and 0.8 phr, to SBR provides a reduction in Tan Delta values, such that they are nearly equal to or lower than those obtained using the coupling agent bis (3-triethoxysilylpropyl) disulfide.

The results of testing in terms of Set Strain versus Storage Modulus (G') at 100° C. is shown in the following Table 5, as Samples 1 through 7.

TABLE 5

Strain (deg.) v. G' (Storage Modulus, MPa) at 100° C.

| Strain | 1 | 2 | 3 | 4 | 5 | 6 | 7 |
|---|---|---|---|---|---|---|---|
| 0.5 | 58.144 | 199.68 | 219.57 | 225.69 | 263.94 | 54.319 | 58.144 |
| 1 | 55.466 | 188.59 | 211.15 | 213.45 | 246.35 | 53.936 | 57.379 |
| 2 | 54.51 | 158.75 | 177.3 | 179.21 | 204.46 | 52.024 | 55.466 |
| 5 | 46.362 | 98.08 | 110.4 | 110.4 | 127.3 | 44.373 | 47.739 |
| 10 | 33.012 | 55.428 | 63.614 | 62.237 | 74.937 | 31.252 | 33.815 |
| 20 | 19.107 | 28.575 | 34.963 | 31.673 | 42.269 | 17.367 | 19.26 |
| 50 | 9.8692 | 11.3 | 16.013 | 13.87 | 17.558 | 8.4615 | 9.9227 |
| 90 | 5.3724 | 4.7136 | 7.455 | 6.7495 | 6.8217 | 5.2491 | 5.2449 |

It can be readily seen from Table 5 by comparing control Sample 1, which only contains SBR, and control Sample 2, which contains SBR and 30 phr silica, that at low strain (set strain angles below 10 deg.) the addition of silica provides an increase in G'. However, when Sample 4 and Sample 5, which contain SBR, silica, and either 0.08 phr or 0.8 phr dibutyltin dilaurate are compared with control Sample 2, which only contains SBR and silica, an increase in G' is achieved. Furthermore, Sample 4 and Sample 5, which contain SBR, silica, and either 0.08 phr or 0.8 phr dibutyltin dilaurate, exhibit G' values that are equal to or higher than those of Sample 3, which contains SBR, silica, and 7.38 phr coupling agent. Additionally, when Samples 6 and Sample 7, which only contain SBR and either 0.062 phr or 0.62 phr dibutyltin dilaurate, are compared with Sample 4 and Sample 5, which contain SBR, silica, and either 0.08 phr or 0.8 phr dibutyltin dilaurate, it can be seen that at low strain (set strain angles below 10 deg.) the combination of silica and dibutyltin dilaurate significantly increases G'.

These results are considered herein to be significant because they combine to demonstrate that the addition of both silica and dibutyltin dilaurate, at 0.08 phr and 0.8 phr, to SBR provides an increase in G', such that they are greater than those obtained using the coupling agent bis (3-triethoxysilylpropyl) disulfide.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a component of a rubber composition which comprises
   (A) elastomer(s) consisting of 100 parts by weight of at least one diene-based elastomer selected from homopolymers and copolymers of isoprene and/or 1,3-butadiene and copolymers of at least one of isoprene and 1,3-butadiene with a vinyl aromatic compound selected from styrene and alpha methylstyrene,
   (B) about 10 to about 150 phr of at least one particulate reinforcing filler comprised of about 10 to about 100 phr of at least one particulate synthetic silica-based material having hydroxyl groups on the surface thereof selected from at least one of aggregates of synthetic amorphous silica, fumed silica, and silica modified carbon black, and correspondingly, from zero to about 80 phr of rubber reinforcing carbon black, and
   (C) at least one organo-metal compound as an organo-tin compound selected from the group consisting of dibutyltin dilaurate, di-n-butylbis(2-ethylhexanoate)tin, di-n-butylbis(2,4-pentanedionate)tin, di-n-butyldiacetoxytin, di-n-butyldiacrylatetin, di-n-butyldimethacrylatetin, dimethyldineodecanoatetin, dioctyldilauryltin and dioctyldineodecanoatetin.

2. The tire of claim 1 wherein said rubber composition is exclusive of additional additive(s) which will readily react with hydroxyl groups contained on the surface of said silica-based material to create an alcohol.

3. The tire of claim 1 wherein said rubber composition is exclusive of any additional additive selected from at least one of bis-(3-alkoxysilylalkyl) polysulfides having an average of at least 2 connecting sulfur atoms in its polysulfidic bridge, alkoxy silanes, and alkyl silanes.

4. The tire of claim 1 wherein said silica-based material is in a form of aggregates of synthetic amorphous silica.

5. The tire of claim 1 wherein said silica-modified carbon black is a carbon black modified by treatment with an alkoxysilane or by co-fuming carbon black and silica at an elevated temperature.

6. The tire of claim 1 wherein said organo-metal compound is introduced to the rubber composition as a composite of said organo-metal compound and said silica based material or as a composite of said organo-metal compound and said carbon black.

7. The tire of claim 1 wherein said organo-metal compound is introduced to the rubber composition as aggregates of synthetic amorphous precipitated silica which has been pre-treated with said organo-metal compound.

8. The tire of claim 1 wherein said organo-metal compound is dibutyltin dilaurate.

9. The tire of claim 1 wherein said diene-based rubber composition contains a syndiotactic polybutadiene polymer.

10. The tire of claim 1 wherein said diene-based rubber composition contains a tin coupled elastomer prepared by organic solvent solution polymerization of monomers selected from 1,3-butadiene, isoprene and styrene diene monomers, and wherein said elastomers are selected from at least one of butadiene copolymers, isoprene/butadiene copolymers, styrene/isoprene copolymers and styrene/isoprene/butadiene terpolymers.

11. The tire of claim 1 wherein said component is a tire tread.

12. The tire of claim 8 wherein said component is a tire tread.

13. The tire of claim 1 having a tread of a cap/base construction where said tread cap is designed to be ground-contacting and said tread base is not intended to be ground contacting, wherein said component is said tread cap.

14. The tire of claim 8 wherein said rubber composition is exclusive of any additional additive selected from at least one of bis-(3-alkoxysilylalkyl) polysulfides having an average of at least 2 connecting sulfur atoms in its polysulfidic bridge, alkoxy silanes, and alkyl silanes.

15. The tire of claim 8 wherein said silica-based material is in a form of aggregates of synthetic amorphous silica.

16. The tire of claim 8 wherein said organo-metal compound is introduced to the rubber composition as aggregates of synthetic amorphous precipitated silica which has been pre-treated with said organo-metal compound.

* * * * *